3,051,675
STABILIZING LATEXES OF CHLOROETHYLENE POLYMERS WITH MONO SODIUM UREA
Marta G. Glueck, Hazel Park, and Austin L. Jankens, Bay City, Mich., assignors to The Dow Chemical Company, Midland, Mich., a corporation of Delaware
No Drawing. Filed Apr. 4, 1960, Ser. No. 19,489
6 Claims. (Cl. 260—29.6)

This invention relates to improvements in polymer latexes and, more particularly, to the stabilization of the pH of chloroethylenic polymer-containing latexes.

Despite the extensive experience of the workers in the art involving the use of chlorethylenic polymers in an aqueous dispersion, or latex; one problem which has persisted has been the drop in pH of the latex resulting from the liberation of a proportion of the chlorine of the polymer. This labile chlorine, upon entering the aqueous phase of the dispersion, forms hydrochloric acid with its consequent effect on pH. A dropping pH can cause a loss of desirable mechanical properties in the latex and can eventually lead to coagulation of the dispersed polymers.

Measures have been taken in the art to remove the labile chlorine or to neutralize the resulting acid. Some of these involves adding strong bases or other electrolytes to the latex composition. Electrolytes have not been too successful for the reason that they, like the acid, tend to induce coagulation of the latex. Strong bases, when they do not induce coagulation, have an adverse effect in that they accelerate the liberation of the labile chlorine from the polymer. Thus, it would be advantageous to the art to have available a material, referred to herein as a "pH stabilizer," which when added to a chloroethylenic polymer latex, would stabilize such latex against a drop in pH.

It is therefore an object of this invention to provide a pH stabilizer for latexes containing chloroethylenic polymers.

It is a further object to preserve the mechanical properties of such latexes against the adverse effects of a drop in pH.

It is a still further object to provide for the pH stabilization of such latexes as a guard against low pH coagulation.

The foregoing and related objects can be obtained in a pH stabilized latex composition of a chloroethylenic polymer containing about 1-2 percent of a compound selected from the group consisting of monosodium urea, 3-sodio-2 oxazolidinone, urea, thiourea, and 1,1 diphenyl urea.

The polymeric material which is subject to the loss of labile chlorine and adapted to be used in the compositions of the invention is any chloroethylenic polymer. This includes, in particular, homopolymers of vinyl chloride and vinylidene chloride as well as copolymers and other interpolymers of vinyl chloride and/or vinylidene chloride with other ethylenic unsaturated comonomers such as vinyl acetate; acrylonitrile; vinyl propionate; the alkyl, cyclo alkyl and aryl acrylates; and the like.

The polymeric material of the invention includes latexes comprising a blend of a chloroethylenic polymer and a polymer free from chlorine. Relatively small proportions of chloroethylenic polymers cause the formation of significant concentrations of hydrochloric acid through the furnishing of chlorine to the aqueous phase of the latex. In this manner a significant drop in pH can occur in latexes containing a relatively large proportion of non-chlorine containing polymers and a relatively small proportion of chloroethylenic polymers.

The pH stabilizers of the invention are monosodium urea, 3-sodio-2 oxazolidinone, urea, thiourea, and 1,1 diphenyl urea. It is to be understood that the sodium of monosodium urea and 3-sodio-2 oxazolidinone can be replaced by any other alkali metal and the resulting compounds are equivalent to the sodium-containing compounds. The pH stabilizers, alone or in combination, comprise about 1-2 percent by weight of the latex composition. Although these limits are not critical the advantages of the invention are rapidly lost as the proportion drops below 1 percent or rises above 2 percent.

*Example 1*

A copolymer latex comprising 47 percent copolymer solids was formed from a copolymer of 70 percent ethyl acrylate and 30 percent vinylidene chloride. A portion of the composition was aged in a convection oven at 60° C. The pH was recorded daily for a period of two weeks, decreasing from 6.5 to 5.7 in one week and 5.5 at the end of the second week.

A similar portion of the composition, to which was added one percent of monosodium urea, was treated in the same manner. The original pH was 6.3, the pH at the end of one week was still 6.3, and the pH at the end of two weeks was 6.15. Thus, while the control dropped 0.8 pH unit, the treated sample remained constant and while the control dropped 1.0 pH unit, the treated sample dropped 0.15.

*Example 2*

A latex of a copolymer of the type described in the foregoing example was formed and has an initial pH of 7.15. A portion of this composition was aged in a convection oven at 60° C. for a two week period. The pH dropped from 7.15 to 6.65 in one week and to 6.0 in two weeks.

A similar portion of the latex, to which 2 percent monosodium urea was added, had an initial pH of 7.1. At the end of one week the pH had risen to 7.8, attaining a high of 8.2 at the end of the first day. At the end of the second week the pH was 8.1. Thus while the control dropped 0.5 pH unit the treated sample increased 0.7 pH unit and while the control dropped 1.15 pH units the treated sample increased 1.0 pH unit.

*Example 3*

A latex of a copolymer of the type described in the foregoing examples was formed and had an initial pH of 7.15. A portion of the latex was aged in a convection oven at 60° C. for two weeks. The pH of the latex dropped to 6.65 in the first week and to 6.0 at the end of the second week.

Two additional portions of the same latex were similarly aged, one containing one percent of 2-sodio-2 oxazolidinone and the second two percent of the same compound. The first treated portion had an initial pH of 7.0. At the end of one week the pH had risen to 7.35, attaining a high of 7.91 at the end of the first day. At the end of the second week the pH had returned to 7.0.

The second treated portion, containing two percent oxazolidinone, had an initial pH of 7.0. At the end of one week the pH had risen to 7.6 attaining a high of 8.65 at the end of the first day. During the second week the pH of this portion dropped back to 7.2.

The foregoing examples were repeated using in turn urea, thiourea, and 1,1 diphenyl urea as the pH stabilizing agent. Comparable results to those shown in the examples were obtained. The foregoing examples were also repeated using latexes including polymers of vinyl chloride and vinylidene chloride and copolymers of these materials with vinyl acrylates, cycloalkyl acrylates, aryl acrylates, and like materials. Results comparable to those of the reported examples were secured.

We claim:

1. A pH stabilized latex composition of a chloroethylenic polymeric material containing about 1-2 percent of monosodium urea.

2. The composition according to claim 1 wherein the polymeric material is vinyl chloride.

3. The composition according to claim 1 wherein the polymeric material is vinylidene chloride.

4. The composition according to claim 1 wherein the polymeric material contains a copolymer of vinyl chloride and another polymerizable material.

5. The composition according to claim 1 wherein the polymeric material contains a copolymer of vinylidene chloride and another polymerizable material.

6. The composition according to claim 1 wherein the polymeric material is a blend of a plurality of polymeric materials at least one of which contains a labile chlorine atom.

References Cited in the file of this patent
UNITED STATES PATENTS

| | | |
|---|---|---|
| 2,103,581 | Gray | Dec. 28, 1937 |
| 2,365,400 | Fikentscher | Dec. 11, 1944 |
| 2,387,571 | Fikentscher et al. | Oct. 23, 1945 |
| 2,588,899 | Voorthuis et al. | Mar. 11, 1952 |
| 2,899,398 | Pflaumer | Aug. 11, 1959 |